(12) United States Patent
Ishibashi et al.

(10) Patent No.: US 6,208,604 B1
(45) Date of Patent: Mar. 27, 2001

(54) APPARATUS AND METHOD FOR OPTICAL DISK REPRODUCTION

(75) Inventors: Hiromichi Ishibashi, Ibaraki; Takashi Kishimoto, Moriguchi; Takuya Asano, Saijo, all of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/175,649

(22) Filed: Oct. 20, 1998

(30) Foreign Application Priority Data

Oct. 21, 1997 (JP) .................................................. 9-288101

(51) Int. Cl.⁷ ...................................................... G11B 7/00
(52) U.S. Cl. .................................. 369/59; 369/47; 369/32
(58) Field of Search ................................ 369/47, 48, 49, 369/50, 54, 58, 59, 124.01, 44.25, 44.34, 44.35, 32

(56) References Cited

U.S. PATENT DOCUMENTS 5,353,175 * 10/1994 Chiba .
5,396,479 * 3/1995 Johann .
5,430,702 * 7/1995 Bish et al. .
5,790,482 * 8/1998 Saga et al. .

FOREIGN PATENT DOCUMENTS

06592787 * 5/1995 (EP) .
0757343 * 2/1996 (EP) .
08031092 * 2/1996 (JP) .
09237459   9/1997 (JP) .

OTHER PUBLICATIONS

European Search Report dated Sep. 12, 1999 for Application No. 98119853.4.*

* cited by examiner

*Primary Examiner*—Muhammad Edun
(74) *Attorney, Agent, or Firm*—Renner, Otto, Boisselle & Sklar

(57) ABSTRACT

An apparatus of the present invention is an optical disk apparatus for irradiating with a laser beam an optical disk on which address marks are recorded at intervals based on a pulse width modulation method and for reproducing data from a reproduced signal based on reflected light. The apparatus includes: a pulse signal reproduction section for producing a reproduced pulse signal from the reproduced signal based on a threshold value; a threshold value production section for producing the threshold value based on the reproduced pulse signal; and a gate signal production section for producing an address gate signal at a timing when the address mark is reproduced.

14 Claims, 10 Drawing Sheets

APPARATUS AND METHOD FOR OPTICAL DISK REPRODUCTION

BACKGROUND OF THE INVENTION

1. Field of the Invention

The present invention relates to an optical disk apparatus for use with an optical disk to/from which data can be recorded and reproduced. More particularly, the present invention relates to an apparatus and a method for reproducing signals from an optical disk recording medium via an optical head, which are capable of reproducing address data with improved accuracy.

2. Description of the Related Art

The popularity of optical disk apparatuses such as CD (compact disk) players and DVD (digital video disk) players has been growing considerably in recent years. A large-capacity optical disk apparatus which allows a user to record data on an optical disk is expected to be commercially available in the near future.

FIG. 9 is a block diagram illustrating part of a conventional optical disk apparatus. An optical head 1001 irradiates a mark string 1000 formed on a recording surface of an optical disk recording medium with a laser beam and detects the reflected light therefrom as an electric signal HF. A comparator 1002 compares the amplitude of the signal HF with a threshold potential VTH and outputs a reproduced pulse signal DT. A charge pump 1003 charges a capacitor 1004 while the reproduced pulse signal DT is at a high level, and discharges the capacitor 1004 while the reproduced pulse signal DT is at a low level. The electric potential of the capacitor 1004 is provided to the comparator 1002 and used as the threshold potential VTH.

The operation of the conventional optical disk apparatus having such a structure will now be described. Binary (digital) data is recorded on the optical disk. More specifically, a mark string including a plurality of concave (or convex) marks is formed on the optical disk in accordance with the binary data to be recorded. The optical head 1001 reproduces a sinusoidal signal (not a pulse-like digital signal) from the mark string because of inter-symbol interference between adjacent marks. An appropriate threshold potential value VTH is provided to produce a pulse signal. Any amplitude in the sinusoidal signal greater than the threshold VTH is determined as a high level amplitude, whereas any amplitude less than the threshold VTH is determined as a low level amplitude.

As illustrated in the left-hand side of FIG. 10, when the threshold potential VTH is relatively low, the reproduced pulse signal DT becomes wide on the high level side and narrow on the low level side. As a result, the capacitor 1004 is charged more than it is discharged, thereby increasing the threshold potential VTH. Thus, the threshold potential VTH is controlled so that the average amount of current charged into the capacitor 1004 substantially equals the average amount of current discharged therefrom. In other words, the threshold potential VTH is controlled so that the average length of the "H" period of the reproduced pulse signal DT (a period during which the signal DT is at the high level) and the average length of the "L" period thereof (a period during which the signal DT is at the low level) are equal or at least closer to each other. The ratio between the "H" period and the "L" period is referred to as "the duty ratio" of the signal DT.

Such an optical disk apparatus may be advantageously used with recording media such as CDs and DVDs, where data is recorded based on the PWM (pulse width modulation) method. The PWM method is a recording method suitable in high density recording applications, where the length of a recording mark varies in accordance with the data to be recorded. When reproducing binary data based on the PWM method, however, even a slight shift in the threshold value VTH may cause an error in the pulse length of the reproduced pulse signal DT, thereby resulting in a reproduction error.

In view of this, feedback control may be constantly performed for the threshold value VTH so that the duty ratio of the reproduced pulse signal is substantially constant as described above, thereby reproducing data without an error (see Japanese Laid-open Publication No. 63-201957).

However, such a method assumes that data is recorded continuously without interruption. When PWM data segments (data segments which are recorded based on the PWM method) exist at intervals on the optical disk, the threshold value VTH follows (varies in accordance with) noise when an optical head scans over an area with no recorded data.

As described above, the conventional method is used for reproducing data from read-only media such as CDs and DVDs, where data is continuously recorded based on the PWM method across the entire surface of the disk. However, an optical disk and an optical disk apparatus which allow a user to record data on the disk are expected to be commercially available in the near future. While several different recording formats have been proposed, such a recordable optical disk typically includes address areas and data areas which are arranged alternately at predetermined intervals. In the data area, a film (e.g., a phase change material film or a magneto-optical recording film) to which data can be recorded by laser heat is provided. In the address area, address data has been recorded as concave or convex marks. Since a recordable optical disk is also desired to have a higher recording density, the PWM method should be applied to the address area as well as to the data area. However, such a "recordable" medium may have a data area with no recorded data. In such a case, only the address area has PWM concave or convex marks (marks recorded based on the PWM method). When this recordable optical disk is reproduced by the conventional method, the unrecorded area is reproduced as a long low-level signal. In response, the feedback control system tries to decrease the threshold value VTH as low as possible. Thus, the threshold value VTH follows the noise, and the optical disk apparatus generates undesired signals by digitizing the noise. As a result, it is not possible to identify the correct address.

SUMMARY OF THE INVENTION

According to one aspect of this invention, an optical disk apparatus is provided for irradiating with a laser beam an optical disk on which address marks are recorded at intervals based on a pulse width modulation method and for reproducing data from a reproduced signal based on reflected light. The apparatus includes: a pulse signal reproduction section for producing a reproduced pulse signal from the reproduced signal based on a threshold value; a threshold value production section for producing the threshold value based on the reproduced pulse signal; and a gate signal production section for producing an address gate signal at a timing when the address mark is reproduced.

In one embodiment of the invention, the threshold value production section produces the threshold value in such a manner that a duty ratio of the reproduced pulse signal reproduced by the pulse signal reproduction section becomes substantially constant.

In one embodiment of the invention, the gate signal production produces the address gate signal based on an envelope of the reproduced pulse signal produced from the reproduced signal.

In one embodiment of the invention, the gate signal production section further includes a section for, if address data is detected in the reproduced pulse signal, producing the address gate signal at a timing which is delayed by a predetermined period of time from a timing at which the address data is detected.

In one embodiment of the invention, the optical disk apparatus further includes a photoelectric converter including a light-receiving portion which is divided along a tracking direction into at least two light-receiving areas, for receiving the reflected light from the optical disk by the light-receiving areas so as to produce at least two reproduced signals. The gate signal production section produces a pulse signal based on a difference between the two reproduced signals and produces the address gate signal based on an envelope of the pulse signal.

In one embodiment of the invention, the address marks include a first address mark and a second address mark which are arranged on opposite sides of, and at a predetermined distance from, a track center line.

In one embodiment of the invention, a first pulse signal is produced from a first difference signal which is produced from the first address mark based on a first threshold value. A second pulse signal is produced from a second difference signal which is produced from the second address mark based on a second threshold value. The address gate signal is produced from an envelope of the first and second pulse signals.

In one embodiment of the invention, the first and second threshold values are controlled by feedback control in such a manner that respective duty ratios of the first pulse signal and the second pulse signal become substantially constant. The optical disk apparatus further includes a section for temporarily holding the feedback control while no address gate signal is produced.

In one embodiment of the invention, the optical disk apparatus further includes a photoelectric converter including a light-receiving portion which is divided along a tracking direction and another direction perpendicular to the tracking direction into at least four light-receiving areas, for receiving the reflected light from the optical disk by the light-receiving areas so as to produce at least four reproduced signals. The gate signal production section produces the address gate signal based on a phase difference between two of the reproduced signals which are output from diagonally-located two of the light-receiving areas.

In one embodiment of the invention, the address marks include a first address mark and a second address mark which are arranged on opposite sides of, and at a predetermined distance from, a track center line.

In one embodiment of the invention, the gate signal production further includes: a section for producing a pulse signal from a difference between two of the reproduced signals which are output from two of the light-receiving areas located on opposite sides of a track center line and for producing the address gate signal from an envelope of the pulse signal; and a section for, if address data is detected in the reproduced pulse signal, producing the address gate signal at a timing which is delayed by a predetermined period of time from a timing at which the address data is detected.

According to another aspect of this invention, a method is provided for reproducing an optical disk, for irradiating with a laser beam an optical disk on which address marks are recorded at intervals based on a pulse width modulation method and for reproducing data from a reproduced signal based on reflected light. The method includes the steps of: producing a reproduced pulse signal from the reproduced signal based on a threshold value; producing the threshold value based on the reproduced pulse signal; and producing an address gate signal at a timing when the address mark is reproduced.

In one embodiment of the invention, the method further includes the steps of: receiving the reflected light from the optical disk by at least two light-receiving areas divided along a tracking direction so as to produce at least two reproduced signals; producing a pulse signal from a difference between the two reproduced signals; and producing the address gate signal from an envelope of the pulse signal.

In one embodiment of the invention, the method further includes the steps of: receiving the reflected light from the optical disk by at least four light-receiving areas divided along a tracking direction and another direction perpendicular to the tracking direction so as to produce at least four reproduced signals; producing the address gate signal based on a phase difference between two of the reproduced signals which are output from diagonally-located two of the light-receiving areas.

Thus, the invention described herein makes possible the advantages of (1) providing an optical disk apparatus capable of setting and maintaining an appropriate threshold value even when reproducing a recordable optical disk which includes address areas and data areas arranged alternately at predetermined intervals; and (2) providing such an optical disk reproduction method.

These and other advantages of the present invention will become apparent to those skilled in the art upon reading and understanding the following detailed description with reference to the accompanying figures.

DESCRIPTION OF THE PREFERRED EMBODIMENTS

Examples 1 to 3 of the present invention will now be described with reference to the accompanying figures.

According to Example 1, it is possible to detect the address area and reproduce the address data therefrom so as to set a threshold value, which is held only in an unrecorded area, thereby successively and accurately reproducing PWM address data segments which exist at intervals.

According to Example 2, even when the PWM address data marks are shifted by a predetermined distance from a track center line, it is possible to detect the address area and reproduce the address data therefrom so as to set a threshold value, which is held only, thereby successively and accurately reproducing PWM address data segments which exist at intervals.

According to Example 3, even when the PWM address data marks are shifted by a predetermined distance from a track center line, it is possible to detect the address area, and the detection of the address data is free from disturbance caused by a tracking offset.

EXAMPLE 1

Figure 1:
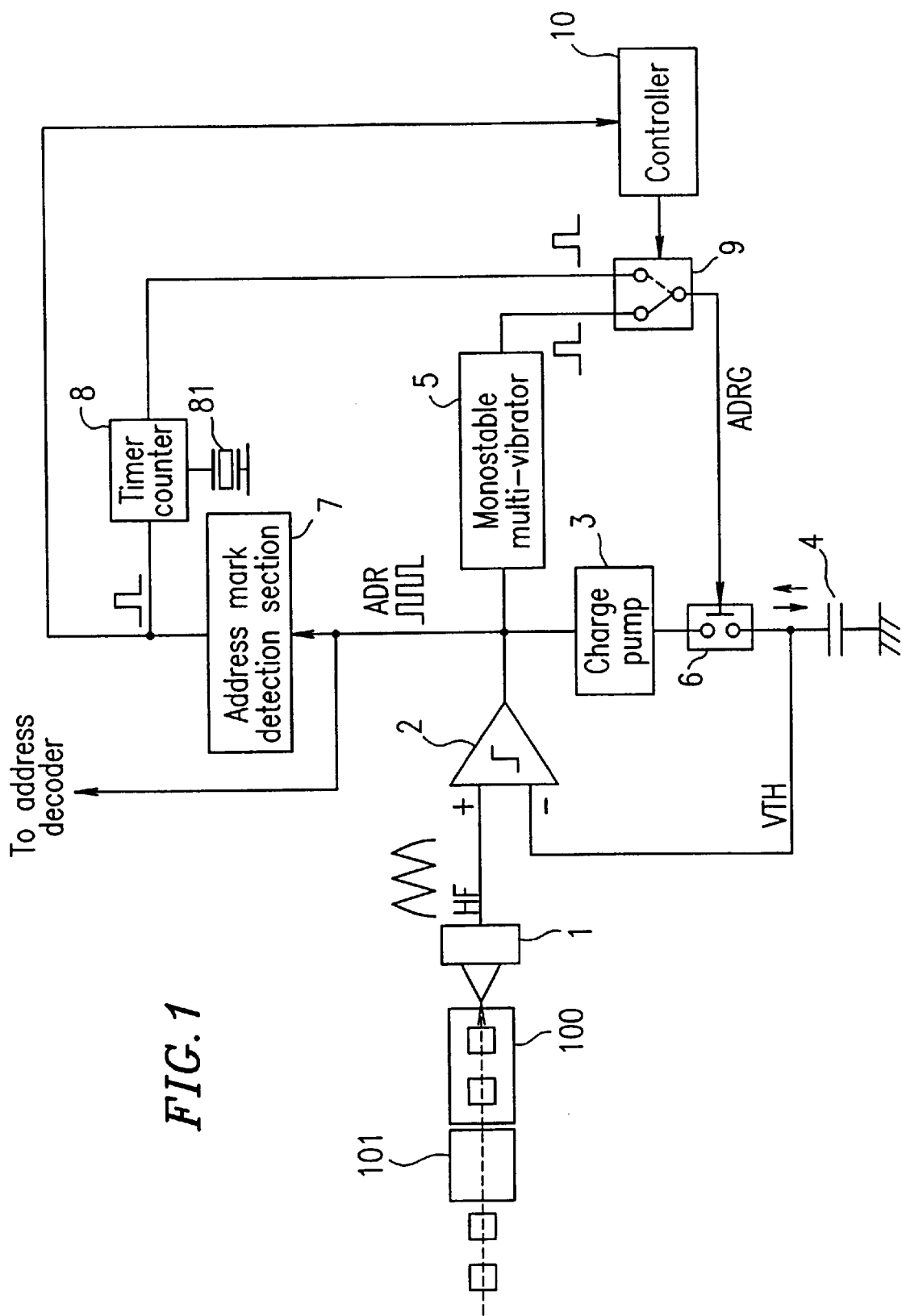
FIG. 1 is a block diagram illustrating an optical disk apparatus according to Example 1 of the present invention.

Example 1 of the present invention will now be described in detail. FIG. 1 is a block diagram illustrating an optical disk apparatus according to Example 1. An address area 100 is provided on the recording surface of an optical disk recording medium. Address data is recorded in the address area 100 as an address mark string (e.g., presence and absence of a concave (or convex) mark). An area provided between two adjacent address areas 100 is used as a data area 101. In the present example, it is assumed that no data is recorded in the data area 101.

An optical head 1 irradiates the recording surface of the optical disk with a laser beam, converts the reflected light therefrom into an electric signal HF, and outputs the electric signal HF. A comparator 2 compares the amplitude of the signal HF with a threshold potential VTH and outputs a reproduced pulse signal ADR. A charge pump 3 charges a capacitor 4 while the reproduced pulse signal ADR is at a high level, and discharges the capacitor 4 while the reproduced pulse signal ADR is at a low level. The electric potential of the capacitor 4 is provided to the comparator 2 and used as the threshold potential VTH. Thus, the comparator 2, the charge pump 3 and the capacitor 4 together form a loop for generating the threshold value VTH while performing feedback control of the threshold value VTH.

The operation of the optical disk apparatus having such a structure will now be described. The optical head 1 reproduces the string including concave (or convex) address marks which have been recorded on the optical disk as the signal HF. The signal HF has a sinusoidal waveform due to the inter-symbol interference occurring between adjacent marks. Therefore, an appropriate feedback control is performed for the threshold value VTH so that any amplitude greater than the threshold VTH is determined as a high level amplitude, whereas any amplitude less than the threshold VTH is determined as a low level amplitude, thus obtaining binary address data.

When the threshold potential VTH is relatively low, the reproduced pulse signal ADR becomes wide on the high level side and narrow on the low level side. As a result, the capacitor 4 is charged more than it is discharged, thereby increasing the threshold potential VTH. Conversely, when the threshold potential VTH is relatively high, the capacitor 4 is discharged more than it is charged, thereby decreasing the threshold potential VTH. Thus, the threshold potential VTH is controlled so that the average amount of current charged into the capacitor 4 substantially equals the average amount of current discharged therefrom. In other words, the threshold potential VTH is controlled so that the average length of the "H" period of the reproduced pulse signal ADR (a period during which the signal ADR is at the high level) and the average length of the "L" period thereof (a period during which the signal ADR is at the low level) are equal or at least closer to each other.

Figure 2:
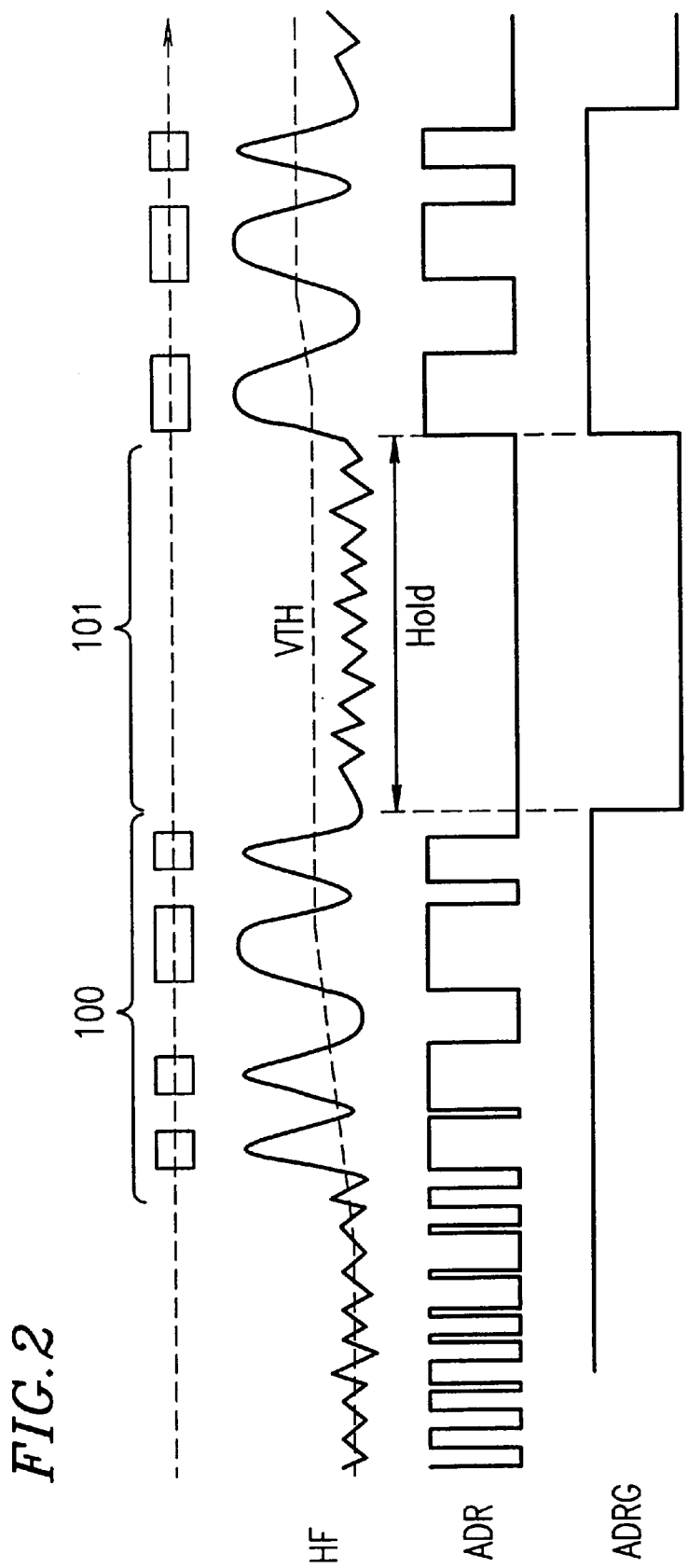
FIG. 2 is a timing diagram illustrating an operation of the optical disk apparatus according to Example 1 of the present invention.

Referring to FIG. 2, when the optical head 1 scans the unrecorded data area 101 where no data has been recorded in the initial stage of the feedback loop, the threshold potential VTH controlled by the feedback loop follows a base level (a potential level of the reproduced signal HF when there is no recorded signal). Even when there is "no recorded signal", there exists a small amount of noise. Therefore, the threshold value VTH is controlled so that the duty ratio of the pulse signal becomes substantially constant. When the optical head 1 then scans the address area 100, the threshold value VTH is increased so that the duty ratio of the reproduced pulse signal ADR in the address area 100 becomes substantially constant.

Without the present invention, when the feedback control is continued after scanning the address area 100, the threshold value VTH follows the base level (the "no signal" level) again as the optical head 1 enters the next unrecorded data area 101. If the address area 100 is provided with sufficient length, the behavior of the threshold value VTH in the unrecorded data area 101 may not cause a significant problem. However, to have such an increased length for the address area 100, the length (and thus the recording capacity) of data area 101 is sacrificed because the total capacity of the disk is fixed. Therefore, the length of the address area 100 should be minimized.

When the address area 100 is too short, however, the laser beam passes over the address area 100 before the threshold value VTH reaches a desired level. Although it is possible to avoid such a problem by increasing the speed at which the threshold value VTH varies (e.g., by decreasing the capacitance of the capacitor 4, or by increasing the current output of the charge pump 3), it would still be impossible to distinguish data obtained by digitizing address data from data obtained by digitizing noise.

In view of this, the optical disk apparatus according to Example 1 is provided with a section for appropriately holding the threshold value VTH while scanning the unrecorded data area 101 based on an address gate signal ADRG. More specifically, the feedback loop is opened by opening a switch 6 while the address gate signal ADRG is at a low level (e.g., while scanning the unrecorded data area 101). Thus, the threshold value VTH at the time when the address gate signal ADRG goes low is maintained. The feedback control of the threshold value VTH resumes when the address gate signal ADRG goes high at the beginning of the next address area 100. Thus, feedback control (such that the duty ratio becomes substantially constant) is performed at intervals only while scanning the address areas 100. Accordingly, it is possible to obtain the reproduced pulse signal ADR which has been digitized with the optimal threshold value VTH. The reproduced pulse signal ADR is then provided to an address decoder, thereby accurately reproducing the address data segments.

An exemplary method for producing the address gate signal ADRG will now be described. Since address data segments are typically provided periodically, once an address data segment is detected, it is possible to estimate the time when the next address segment should be reproduced and to produce the address gate signal ADRG at the estimated time. Referring to FIG. 1, as soon as an address mark detection section 7 (including, for example, a pattern match detection circuit) detects an address identification flag in the reproduced pulse signal ADR, the address mark detection section 7 generates a trigger pulse to activate a timer counter 8. Upon receiving the trigger pulse, the timer counter 8 starts counting clock pulses from a quartz oscillator 81. After a predetermined time interval, the timer counter 8 generates a gate signal, which is provided to the switch 6 as the address gate signal ADRG. The time interval can be uniquely determined by the address interval defined by the optical disk format and the linear velocity of the optical disk.

While the above-described operation assumes that an address mark can be detected without the address gate signal ADRG, there is no address gate signal ADRG providied when detecting the first address mark after the start-up of the apparatus or after a track jump. Detecting an address without using the address gate signal ADRG but only using the reproduced pulse signal ADR may not be successful in some situations. For example, one of the pulse signal strings obtained by digitizing noise may happen to have a data pattern that is identical to that of an address mark, whereby subsequent operations may be performed at erroneous timings based on this erroneously-detected address.

In view of this, in the present example, the first address mark is detected using a re-triggerable monostable multi-vibrator 5, not the address mark detection section 7, thereby ensuring detection of the first address mark.

Referring to FIG. 1, the re-triggerable monostable multi-vibrator 5 holds a fixed high (or low) level output for a certain period of time (a "holding period") once the monostable multi-vibrator 5 receives a pulse edge. If the monostable multi-vibrator 5 receives another pulse edge during the holding period, the monostable multi-vibrator 5 begins a new holding period. As a result, the obtained signal substantially represents an envelope of the reproduced pulse signal ADR, as illustrated in FIG. 2. While scanning an address area 100, pulse edges of the reproduced pulse signal ADR are successively provided to the monostable multi-vibrator 5. Therefore, while scanning an address area 100, by setting the holding period to be longer than the possible longest address mark, it is ensured that a pulse edge is input before a holding period ends, thereby maintaining the output of the monostable multi-vibrator 5 at the high level.

The obtained signal can be used as the address gate signal ADRG to allow the threshold value VTH to be appropriately varied and held without using the address mark detection section 7, thereby accurately reproducing the address data. In this method, however, spike-like noise may occur in an unrecorded area, and an erroneous address gate signal may be generated therefrom. In view of this, the monostable multi-vibrator 5 is used to generate the address gate signal ADRG, only before the first address mark is detected. Once an address mark is detected, the operation mode is switched to the mode where the timer counter 8 is employed. Referring to FIG. 1, a switch 9 receives an instruction from a controller 10 and switches the mode of detecting the address gate signal ADRG.

As described above, according to the present example, address data segments can be accurately reproduced from an optical disk on which PWM data segments exist at intervals.

In the present example, a single comparator (the comparator 2) is used to generate a pulse signal to be provided to the monostable multi-vibrator 5 for address gate generation and to generate a pulse signal to be provided to the address decoder. However, separate comparators may alternatively be provided without departing from the spirit of the present invention.

Figure 3:
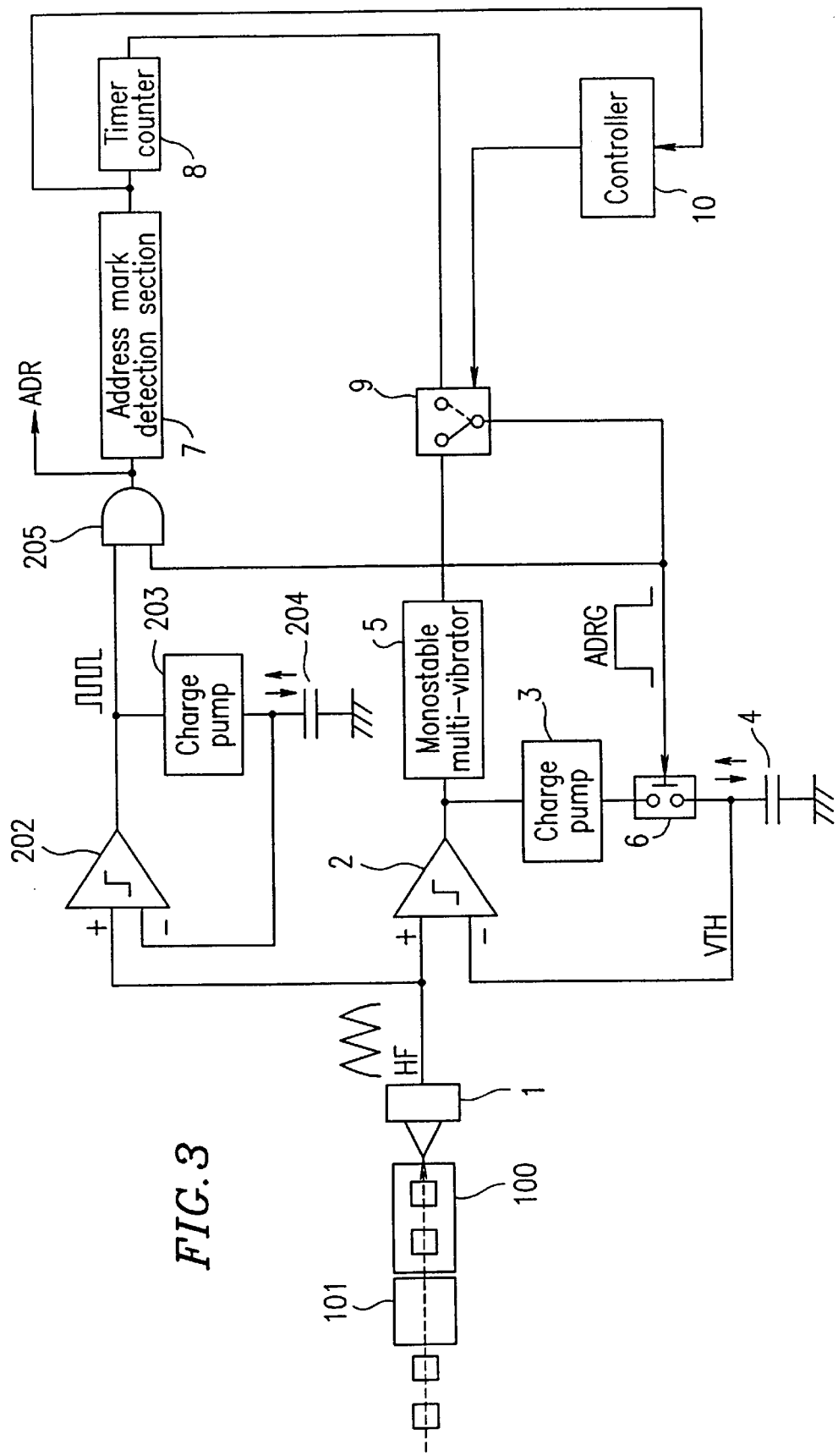
FIG. 3 is a block diagram illustrating an optical disk apparatus according to a variation of Example 1.

FIG. 3 illustrates a variation of Example 1. Referring to FIG. 3, a comparator 202, a charge pump 203 and a capacitor 204 together form a separate threshold value control circuit which produces a reproduced pulse signal ADR used for address reproduction. Since the threshold value control circuit does not have a function to hold the threshold value VTH, a pulse signal may be generated by digitizing noise as described above. However, this can be eliminated by using an AND gate 205 to which the address gate signal ADRG is provided through one of the terminals thereof.

An advantage of this variation is that the respective threshold value control circuits for gate generation and for address reproduction can be independently optimized. It is typically desirable that the threshold value VTH varies at a relatively high speed for address reproduction and at a relatively low speed for gate generation which involves the holding operation.

EXAMPLE 2

Figure 4:
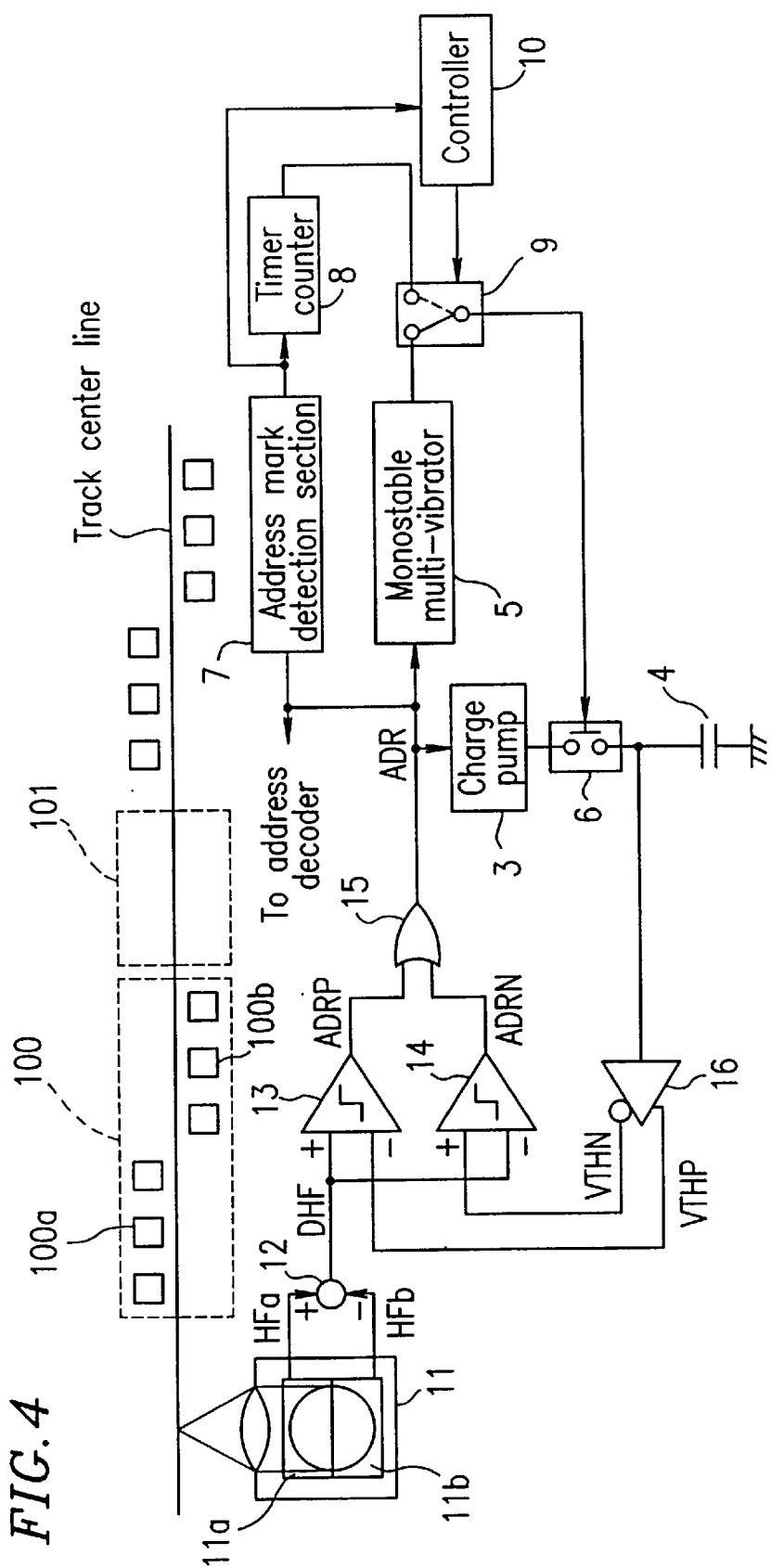
FIG. 4 is a block diagram illustrating an optical disk apparatus according to Example 2 of the present invention.

Example 2 of the present invention will now be described in detail. FIG. 4 is a block diagram illustrating an optical disk apparatus according to Example 2. Referring to FIG. 4, in the address area 100 on the optical disk, address mark strings 100a and 100b are formed on opposite sides of, and a particular distance from, the track center line. The track center line corresponds to the center of a mark recorded in the data area 101, and is an ideal track for the laser beam from an optical head to scan while recording and reproducing marks to/from the data area 101. An optical head 11 includes a photosensor which is divided into two photosensor elements 11a and 11b along the track center line. A differential amplifier 12 is used to obtain a difference signal based on respective outputs from the photosensor elements 11a and 11b. Comparators 13 and 14 produce binary pulse signals ADRP and ADRN from the difference signal based on threshold values VTHP and VTHP, respectively. An OR gate 15 (an addition section) logically adds the binary pulse signals ADRP and ADRN to provide the logical sum as the reproduced pulse signal ADR. The charge pump 3, the capacitor 4, the monostable multi-vibrator 5 and the switch 6, respectively, function in the same manner as those illustrated in FIG. 1. A differential output amplifier 16 provides a positive output and a negative output to the comparators 13 and 14 as the threshold values VTHP and VTHN, respectively.

The reason for separating the address mark strings 100a and 100b from each other, as illustrated in FIG. 4, is as follows. When the track density of the data area is increased, a read error rate is also increased due to crosstalk noise between adjacent tracks. However, a read error rate to a certain degree can be tolerated since data is recorded in the data area with an error correction code attached thereto. However, such an error correction code is not typically attached to address data because as soon as an optical disk drive recognizes the address data in an address area, the drive has to start recording or reproducing data to/from the data area following the address area, and therefore there is no time for the optical disk drive to perform an error correction process for the address data. Thus, in order to suppress or eliminate the influence of the crosstalk noise, address marks are typically arranged at a track pitch which is twice as great as that used in the data area, while the address marks are shifted from the track center line by ½ track pitch so that the address marks can be equally reproduced along any one of the tracks on which the marks are present.

Figure 5:
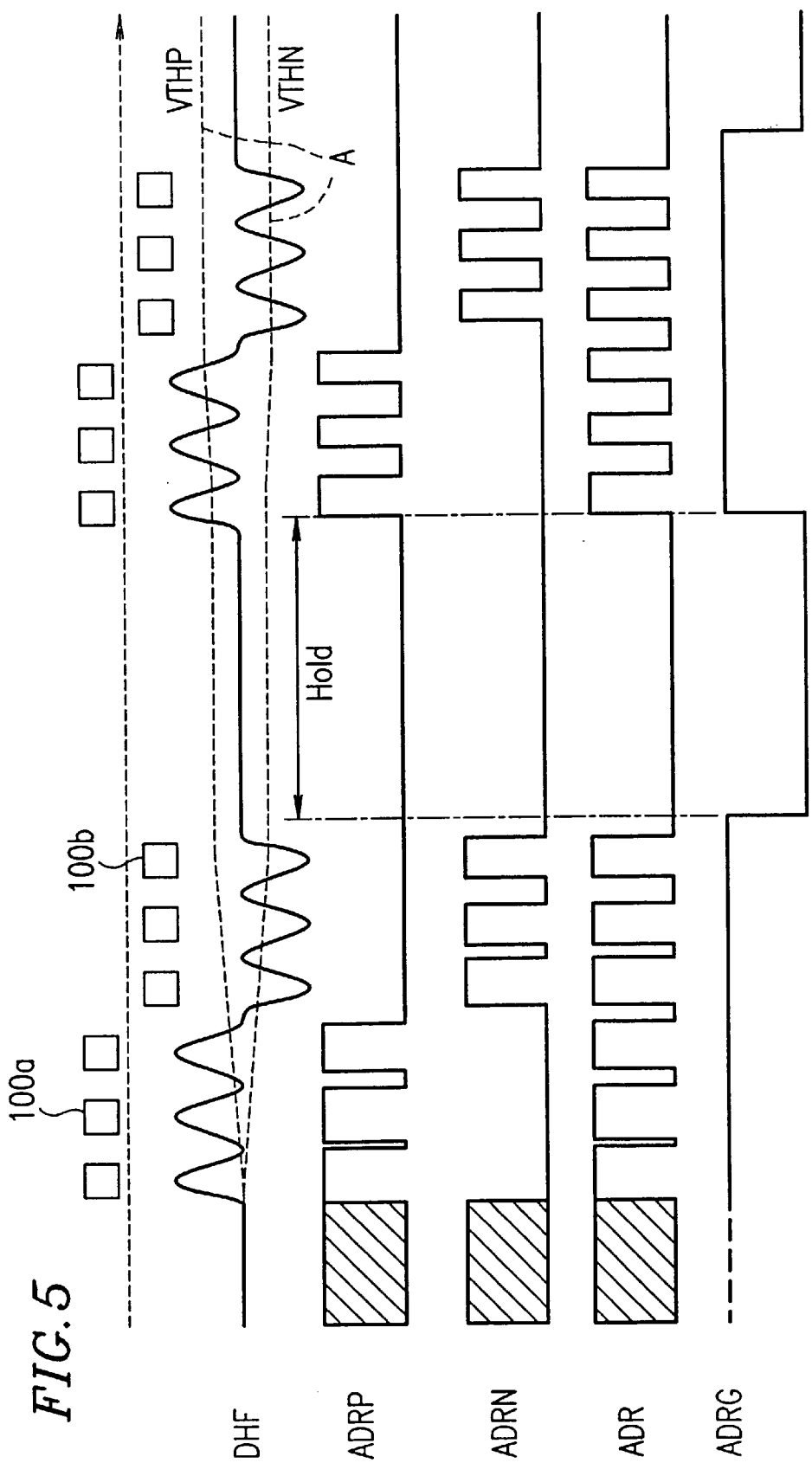
FIG. 5 is a timing diagram illustrating an operation of the optical disk apparatus according to Example 2 of the present invention.

When the laser beam from the optical head 11 scans along the track center line of the optical disk, the laser beam is diffracted by the address mark strings 100a and 100b. More specifically, the address mark strings 100a and 100b cause optical interference which results in a diffraction pattern on the photosensor elements 11a and 11b, The address mark strings 100a and 100b are detected based on the brightness of the diffraction pattern. Consequently, the address mark strings 100a and 100b can be considered as being detected by the photosensor elements 11a and 11b, respectively. A signal DHF is obtained as the difference between the respective outputs from the photosensor elements 11a and 11b, Thus, the address represented by the address mark strings 100a and 100b can be detected as the signal DHF. As illustrated in FIG. 5, the signal DHF goes high and low with respect to the base level in accordance with the address mark strings 100a and 100b.

As described above, the threshold values VTHP and VTHN used by the comparators 13 and 14, respectively, are provided as the positive and negative outputs from the differential output amplifier 16. Thus, the threshold values VTHP and VTHN respectively vary symmetrically with respect to the base potential, as illustrated by broken line A in FIG. 5 in accordance with an input signal (the potential at the terminal of the capacitor 4). The comparator 13 generates a pulse signal ADRP which is at a high level while the signal DHF is over the threshold value VTHP. The comparator 14 generates a pulse signal ADRN which is at a high level while the signal DHF is below the threshold value VTHN. The pulse signals ADRP and ADRN are logically added together to obtain the reproduced pulse signal ADR. Therefore, this detection system is substantially equivalent to that illustrated in FIG. 1 (which uses only one comparator) for the charge pump 3 and the capacitor 4 of the feedback control section. Thus, feedback control is performed so that the pulse duty ratio of the reproduced pulse signal ADR (=ADRP+ADRN) becomes substantially constant. As in Example 1, the reproduced pulse signal ADR is then provided to an address decoder, thereby accurately reproducing the address data segments.

Thus, it is possible to perform the threshold value VTH feedback control at intervals in the same manner as described in Example 1 by operating the switch 6 using the output of the monostable multi-vibrator 5 as the address gate signal ADRG. Also as described in Example 1, after the first address mark is detected by the address mark detection section 7, the switch 9 is operated by the controller 10 so that a pulse signal generated by the timer counter 8 is used as the address gate signal ADRG.

As described above, according to the present example, the address data can be reproduced from a pair of address mark strings 100a and 100b (which are shifted from each other with respect to the track center line) as accurately as when the address mark strings are arranged along the track center line.

EXAMPLE 3

Figure 6:
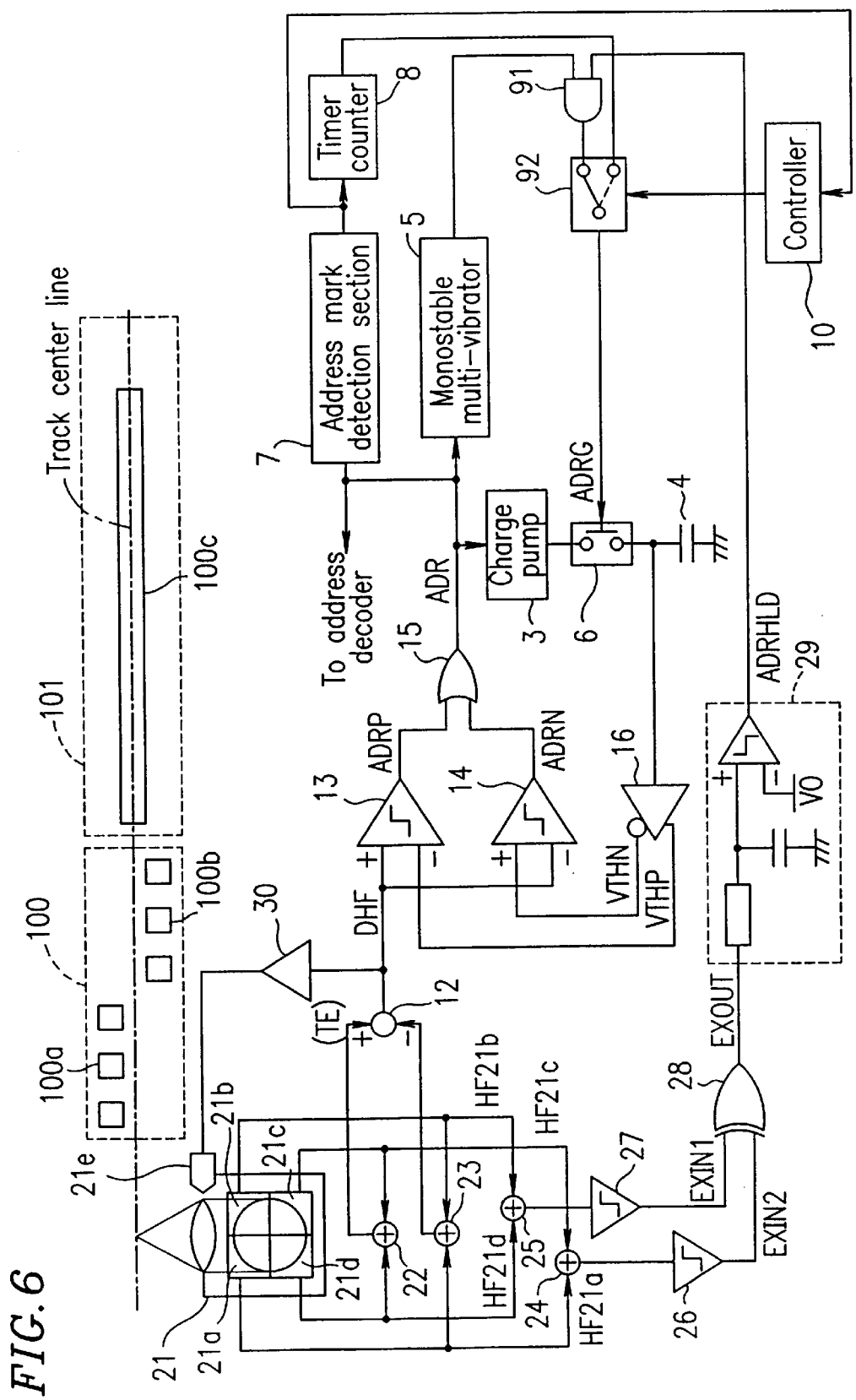
FIG. 6 is a block diagram illustrating an optical disk apparatus according to Example 3 of the present invention.

Example 3 of the present invention will now be described in detail. FIG. 6 is a block diagram illustrating an optical disk apparatus according to Example 3. Referring to FIG. 6, in the address area 100 on the optical disk, the address mark strings 100a and 100b are formed on opposite sides of, and a particular distance from, the track center line, in the same manner as illustrated in FIG. 3. An optical head 21 includes a photosensor which is. divided into four photosensor elements 21a, 21b, 21c and 21d along the track center line and a direction perpendicular thereto. The photosensor elements 21a, 21b, 21c and 21d output signals HF21a, HF21b, HF21c and HF21d, respectively. An addition amplifier 22 computes and outputs HF21a+HF21b, and another addition amplifier 23 computes and outputs HF21c+HF21d. The output sum signals HF21a+HF21b and HF21c+HF21d are substantially equivalent to the signals HFA and HFB in FIG. 4. An addition amplifier 24 computes and outputs HF21a+HF21c, and another addition amplifier 25 computes and outputs HF21b+HF21d. The differential amplifier 12, the comparators 13 and 14, the OR gate 15, the differential output amplifier 16, the charge pump 3, the capacitor 4 and the switch 6 function in the same manner as those illustrated in FIG. 3. Thus, the feedback control system for the threshold values VTHP and VTHN also functions in the same manner as that of Example 2.

A distinctive feature of the present example is the use of an additional detection section, in addition to the monostable multi-vibrator 5, for holding the threshold value feedback control. Comparators 26 and 27 digitize the sum signals HF21a+HF21c and HF21b+HF21d, respectively. An EXOR gate 28 detects a phase difference between respective pulse signals output from the comparators 26 and 27. Using the photosensor elements 21a, 21b, 21c and 21d and the addition amplifiers 24 and 25, a received light beam is appropriately divided into two portions, from which first and second reproduced signals are produced, respectively. The comparators 26 and 27 and the EXOR gate 28 detect a relative phase difference between the first and second reproduced signals. A determination section 29 determines whether the phase difference is greater than a predetermined value (VO), and outputs a pulse signal HLD based on the determination. The output signal HLD is used to operate the switch 6.

The operation of the optical disk apparatus having such a structure will now be described. In an actual optical disk drive, a tracking control is performed so as to accurately scan a laser beam along the data segments recorded in the data areas 101. Referring to FIG. 6, a tracking groove 100c has been provided in an optical disk, and a tracking error signal TE is obtained using the tracking groove 100c. A tracking actuator 21e is controlled so that the tracking error signal TE is kept substantially at a target value. The output of the differential amplifier 12 can be used directly as the tracking error signal TE. When the laser beam is shifted from the tracking groove 100c, the reflected light becomes asymmetric between the photosensor elements 21a and 21b and the photosensor elements 21c and 21d, thereby generating a difference between the respective detected signal amplitudes, which is used as the tracking error signal. In particular, the obtained difference is provided back to the tracking actuator 21e of the optical head 21 via a drive amplifier 30 so as to perform the feedback tracking control.

However, since the address mark strings 100a and 100b are shifted from the track center line, the address mark strings 100a and 100b create tracking disturbance. When the laser beam scans the address area 100, the tracking feedback system functions to shift the laser beam toward the address mark string 100a first, and then toward address mark string 100b. Since the response of the tracking actuator 21e is not so fast, the actual shifting of the laser beam toward the address mark strings 100a and 100b occurs with some delay. As a result, in the beginning of the data area 101, the laser beam is shifted from the track center line, and then starts winding about the tracking groove until the laser beam starts running stably along the tracking center line (as indicated by broken line D in FIG. 7). Accordingly, the difference signal DHF also winds widely for a while and then starts converging to the base level.

Figure 7:
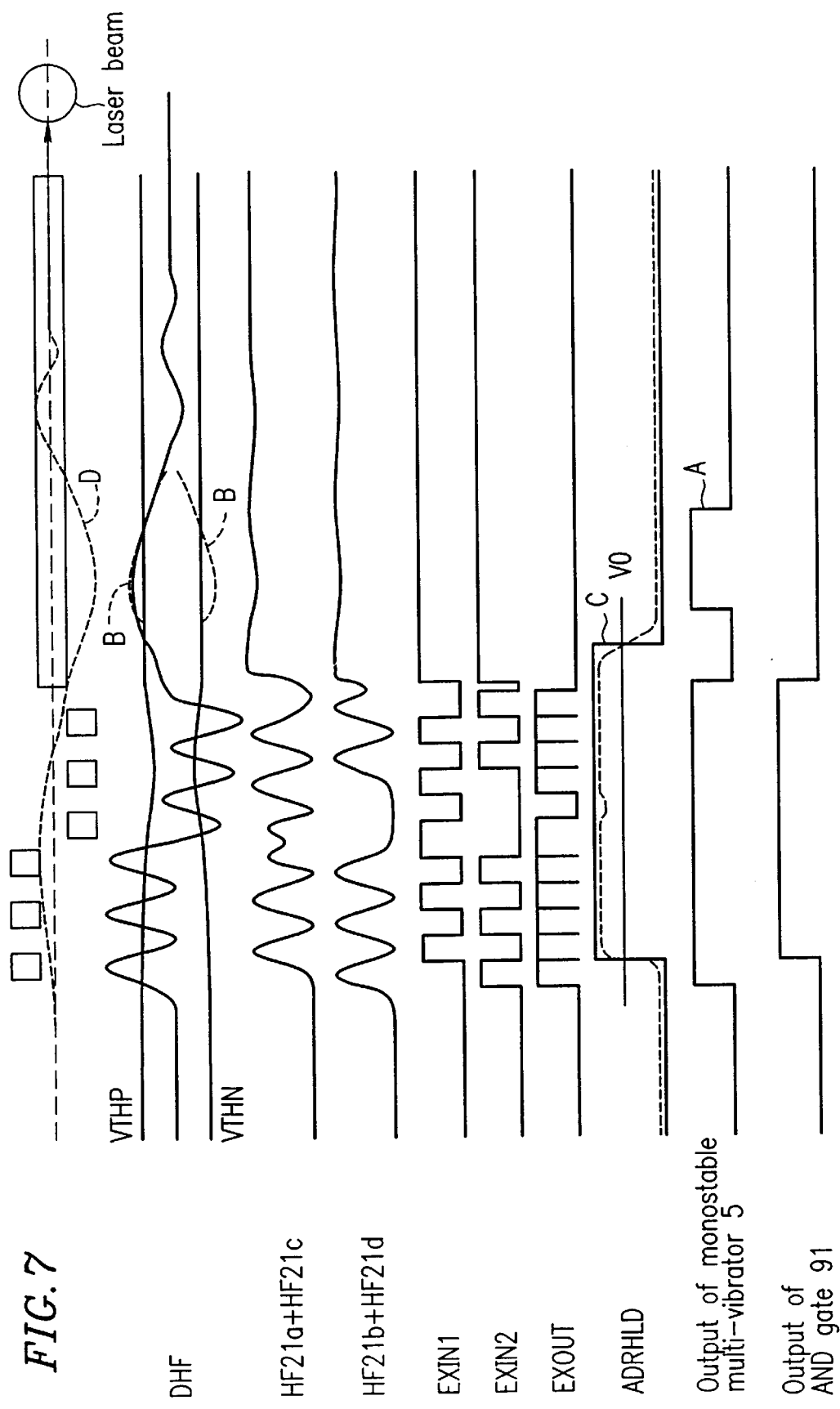
FIG. 7 is a timing diagram illustrating an operation of the optical disk apparatus according to Example 3 of the present invention.

When the difference signal DHF winds widely and goes beyond the threshold value VTHP or VTHN, the monostable multi-vibrator 5 is activated, as indicated by "A" in FIG. 7. With the structure illustrated in FIG. 4, the switch 6 would be operated, thereby starting an erroneous threshold value control, as indicated by the broken line B in FIG. 7. In view of this, the optical disk apparatus of the present example uses the following means to effectively identify the address mark strings 100a and 100b which are shifted from the track center line.

First, the addition amplifiers 24 and 25 output the diagonal sum signals HF21a+HF21c and HF21b+HF21d, respectively. The signals HF21a+HF21c and HF21b+HF21d are converted into pulse signals by the comparators 26 and 27, respectively, and then provided to the EXOR gate 28. As will be discussed later, the comparators 26 and 27 and the EXOR gate 28 together form a type of phase comparison section. The determination section 29 produces a pulse signal ADRHLD which is at a high level when a phase difference EXOUT is greater than a predetermined value. The switch 6 is operated by the pulse signal ADRHLD.

It is known that when the laser beam scans along the concave (or convex) marks provided in a non-continuous, broken pattern on an optical disk, there is generally some relative phase difference between the diagonal sum signals HF21a+HF21c and HF21b+HF21d in accordance with the amount by which the scanning track is shifted from the track center line (see, for example, Japanese Publication for Opposition No. 5-80053). This is believed to be due to optical diffraction caused by an edge of each mark along the tangential direction of the disk. Since the address mark strings 100a and 100b are shifted from the track center line, when the laser beam scans approximately along the track center line, the diagonal sum signals HF21a+HF21c and HF21b+HF21d have a phase difference with respect to each other, as illustrated in FIG. 7.

Figure 8:
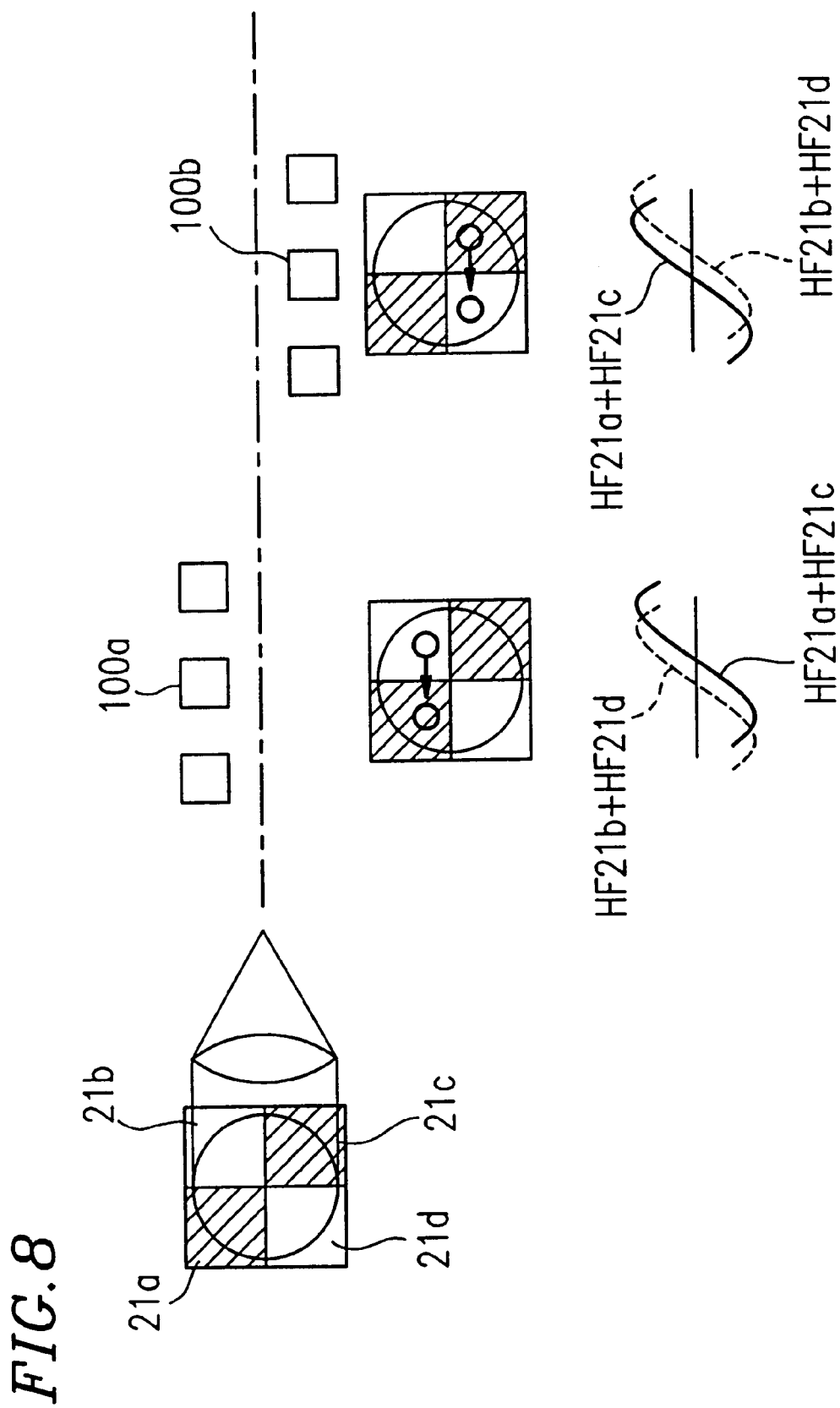
FIG. 8 is a diagram illustrating an operation of the optical disk apparatus according to Example 3 of the present invention.
Figure 9:
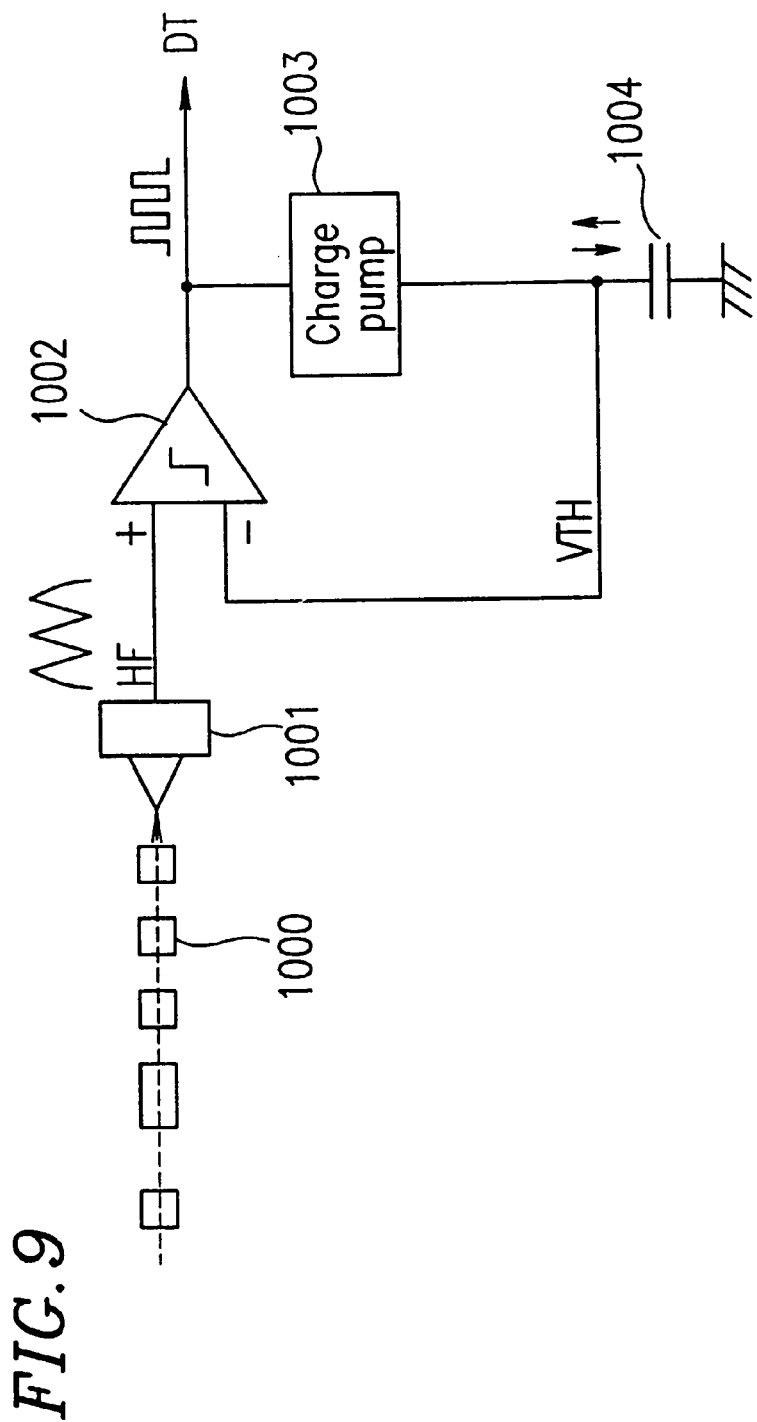
FIG. 9 is a block diagram illustrating a conventional optical disk apparatus.
Figure 10:
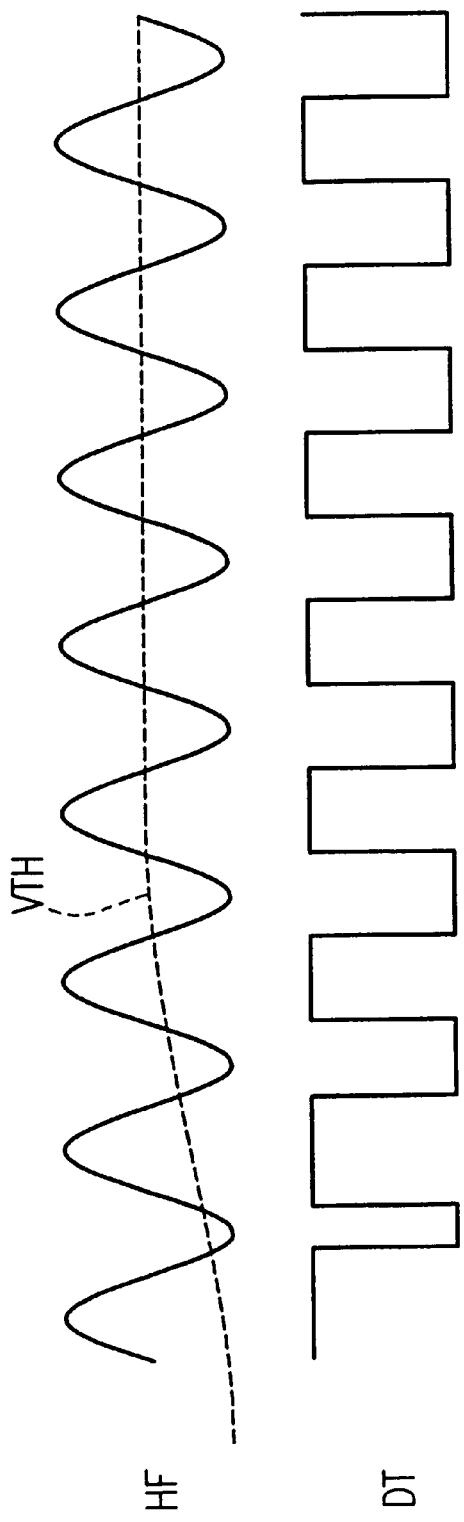
FIG. 10 is a timing diagram illustrating an operation of the conventional optical disk apparatus of FIG. 9.

This will be briefly discussed with reference to FIG. 8. Assuming that the laser beam scans substantially along the track center line, the address mark string 100a is projected onto the photosensor elements 21a and 21b. As the laser beams moves on, the projected image moves from the photosensor element 21b toward the photosensor element 21a. Therefore, the diagonal sum signal HF21a+HF21c for the pair of the photosensor elements 21a and 21c, which are hatched in FIG. 8, has a phase lag with respect to the other diagonal sum signal HF21b+HF21d for the other pair of the photosensor elements 21b and 21d, as illustrated in FIG. 8. Similarly, the address mark string 100b is projected onto the photosensor elements 21c and 21d. Then, the diagonal sum signal HF21a+HF21c has a phase lead with respect to the other diagonal sum signal HF21b+HF21d, as illustrated in FIG. 8. Thus, it is possible to distinguish the address area 100 from other areas by detecting the phase difference between the diagonal sum signals and comparing the phase difference with a predetermined value. In the present example, the diagonal sum signals are converted into pulse signals EXIN1 and EXIN2 by the comparators 26 and 27 and then input to the EXOR gate 28. The EXOR gate 28 outputs the pulse signal EXOUT having a width in accordance with the phase difference, regardless of whether it is a phase lead or a phase lag. The determination section 29 smoothes the phase difference pulse signal EXOUT using a low pass filter, and produces the pulse signal ADRHLD which is at a high level while the value of the smoothed signal represents is greater than a predetermined value VO.

Since the winding of the difference signal DHF due to the vibration of the objective lens actuator is caused by a tracking groove, which is formed continuous manner unlike the recording marks, such winding does not cause a phase difference. Even if a slight phase difference is generated, it is not recognized by the comparators 26 and 27. Therefore, the outputs EXIN1 and EXIN2 are not influenced by the tracking groove. Thus, the EXOR gate 28 outputs the pulse signal EXOUT which is purely based on the address mark strings 100a and 100b. In other words, the address mark strings 100a and 100b are detected by detecting the above-described phase difference, thereby avoiding an erroneous detection due to such winding.

By using the phase difference between the diagonal sum signals as described above, it is possible to distinguish the address area 100 from other areas without being influenced by the tracking control residue. However, according to this method, the pulse signal representing the phase difference has to be smoothed through the low pass filter, thereby generating a detection delay (see ADRSHLD in FIG. 7). Particularly; when the falling edge is delayed (indicated by "C" in FIG. 7), the gate is opened in an area other than the address area 100, the threshold value varies toward the base level before starting a holding operation. Although the amount of delay can be reduced by increasing the cut-off frequency of the low pass filter, the smoothing efficiency is then reduced, whereby the optical disk apparatus may malfunction due to a ripple component. In view of this, in the present example, the delay of the signal is eliminated by employing the output of the monostable multi-vibrator 5 (which functions in the same manner as described in the preceding examples) and an AND gate 91. As in the preceding examples, after the first address mark is detected by the address mark detection section 7, a switch 92 is operated by the controller 10 so that a pulse signal generated by the timer counter 8 is used as the address gate signal ADRG.

Although it is assumed in the above-described examples that the data area 101 (a tracking groove) is unrecorded, recording marks may be recorded in the data area 101 in practice. It is believed that such recording marks would not influence the operation of the above-described examples. A significant phase difference is generated between the diagonal sum signals only when the laser beam scans over concave (or convex) marks formed on the recording surface of the optical disk. A very slight or no phase difference is generated when the laser beam scans over flat marks in the data area 101 which are formed by varying the refractive index of a portion of the film material by heating the recording film (e.g., a phase change film) with a laser beam. The phase difference generated by address mark strings and the phase difference generated by data recording marks can be distinguished from each other by setting an appropriate threshold value VO. Moreover, the marks recorded substantially along the track center line are equally projected onto the photosensor elements 21a and 21b and the photosensor elements 21c and 21d. Therefore, these signal components are cancelled out by the differential calculation performed by the differential amplifier 12, thereby preventing the recording mark components from being mixed in the difference signal DHF. As a result, the address gate signal ADRG produced by the monostable multi-vibrator 5 is not influenced.

As described above, the optical disk apparatus of the present example is provided with a section for detecting the phase difference between the diagonal sum signals based on the output signals from the group of photosensor elements. Therefore, it is possible to accurately detect the address data even when there is some tracking winding.

In Examples 2 and 3, a single set of comparators (the comparators 13 and 14) is used to generate a pulse signal to be provided to the monostable multi-vibrator 5 for address gate generation and to generate a pulse signal to be provided to the address decoder. However, without departing from the spirit of the present invention, separate sets of comparators may alternatively be provided. As in the variation of Example 1, a separate comparator can be separately provided for generating a pulse signal to be provided to the address decoder, where a noise component can be removed by an AND gate.

As described above, it is possible to detect the address area and reproduce the address data therefrom so as to set a threshold value, which is held only in an unrecorded area, thereby successively and accurately reproducing PWM address data segments which exist at intervals.

Moreover, even when the PWM address data marks are shifted by a predetermined distance from a track center line, it is possible to detect the address area and reproduce the address data therefrom so as to set a threshold value, which is held only, thereby successively and accurately reproducing PWM address data segments which exist at intervals.

Furthermore, even when the PWM address data marks are shifted by a predetermined distance from a track center line, it is possible to detect the address area, and the detection of the address data is free from disturbance caused by a tracking offset.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disk apparatus for irradiating with a laser beam an optical disk on which address marks are recorded at intervals based on a pulse width modulation method and for reproducing data from a reproduced signal based on reflected light, the apparatus comprising:
    a pulse signal reproduction section for producing a reproduced pulse signal from the reproduced signal based an a threshold value;
    a gate signal production section for producing an address gate signal at a timing when the address mark is reproduced; and
    a threshold value production section for producing the threshold value based on the reproduced pulse signal and the address gate signal.

2. An optical disk apparatus according to claim 1, wherein the threshold value production section produces the threshold value in such a manner that a duty ratio of the reproduced pulse signal reproduced by the pulse signal reproduction section becomes substantially constant.

3. An optical disk apparatus according to claim 1, wherein the gate signal production produces the address gate signal based on an envelope of the reproduced pulse signal produced from the reproduced signal.

4. An optical disk apparatus according to claim 3, wherein the gate signal production section further comprises a section for, if address data is detected in the reproduced pulse signal, producing the address gate signal at a timing which is delayed by a predetermined period of time from a timing at which the address data is detected.

5. An optical disk apparatus according to claim 1, further comprising a photoelectric converter including a light-receiving portion which is divided along a tracking direction into at least two light-receiving areas, for receiving the reflected light from the optical disk by the light-receiving areas so as to produce at least two reproduced signals, wherein
    the gate signal production section produces a pulse signal based on a difference between the two reproduced signals and produces the address gate signal based on an envelope of the pulse signal.

6. An optical disk apparatus according to claim 5, wherein the address marks include a first address mark and a second address mark which are arranged on opposite sides of, and at a predetermined distance from, a track center line.

7. An optical disk apparatus according to claim 5, wherein:
    a first pulse signal is produced from a first difference signal which is produced from the first address mark based on a first threshold value;
    a second pulse signal is produced from a second difference signal which is produced from the second address mark based on a second threshold value; and
    the address gate signal is produced from an envelope of the first and second pulse signals.

8. An optical disk apparatus according to claim 5, wherein:
    the first and second threshold values are controlled by feedback control in such a manner that respective duty ratios of the first pulse signal and the second pulse signal become substantially constant; and
    the optical disk apparatus further includes a section for temporarily holding the feedback control while no address gate signal is produced.

9. An optical disk apparatus according to claim 1, further comprising a photoelectric converter including a light-receiving portion which is divided along a tracking direction and another direction perpendicular to the tracking direction into at least four light-receiving areas, for receiving the reflected light from the optical disk by the light-receiving areas so as to produce at least four reproduced signals, wherein
    the gate signal production section produces the address gate signal based on a phase difference between two of the reproduced signals which are output from diagonally-located two of the light-receiving areas.

10. An optical disk apparatus according to claim 9, wherein the address marks include a first address mark and a second address mark which are arranged on opposite sides of, and at a predetermined distance from, a track center line.

11. An optical disk apparatus according to claim 9, wherein the gate signal production further comprises:
    a section for producing a pulse signal from a difference between two of the reproduced signals which are output from two of the light-receiving areas located on opposite sides of a track center line and for producing the address gate signal from an envelope of the pulse signal; and
    a section for, if address data is detected in the reproduced pulse signal, producing the address gate signal at a timing which is delayed by a predetermined period of time from a timing at which the address data is detected.

12. A method for reproducing an optical disk, for irradiating with a laser beam an optical disk on which address marks are recorded at intervals based on a pulse width modulation method and for reproducing data from a reproduced signal based on reflected light, the method comprising the steps of:

producing a reproduced pulse signal from the reproduced signal based on a threshold value;

producing an address gate signal at a timing when the address mark is reproduced; and producing the threshold value based on the reproduced pulse signal and the address gate signal.

13. A method for reproducing an optical disk according to claim 12, further comprising the steps of:

receiving the reflected light from the optical disk by at least two light-receiving areas divided along a tracking direction so as to produce at least two reproduced signals;

producing a pulse signal from a difference between the two reproduced signals; and producing the address gate signal from an envelope of the pulse signal.

14. A method for reproducing an optical disk according to claim 12, further comprising the steps of:

receiving the reflected light from the optical disk by at least four light-receiving areas divided along a tracking direction and another direction perpendicular to the tracking direction so as to produce at least four reproduced signals;

producing the address gate signal based on a phase difference between two of the reproduced signals which are output from diagonally-located two of the light-receiving areas.

* * * * *